United States Patent [19]

Fullam et al.

[11] Patent Number: 5,666,569
[45] Date of Patent: Sep. 9, 1997

[54] SYSTEM AND METHOD FOR DETECTING AND INDICATING PROPER FOCAL DISTANCE IN A FIXED LENS CAMERA

[75] Inventors: Scott F. Fullam, Santa Clara; Eric C. Anderson, San Jose, both of Calif.

[73] Assignee: Flashpoint Technology, Inc., San Jose, Calif.

[21] Appl. No.: 296,354

[22] Filed: Aug. 25, 1994

[51] Int. Cl.⁶ ......................................... G03B 13/36
[52] U.S. Cl. ........................................... 396/101
[58] Field of Search ............................. 354/409, 162,
354/195.1, 288, 289.11, 289.12, 289.1;
348/356, 346; 396/101

[56] References Cited

U.S. PATENT DOCUMENTS

| | | | |
|---|---|---|---|
| 3,682,070 | 8/1972 | Kiceniuk | 354/162 |
| 3,930,261 | 12/1975 | Stauffer | 354/25 |
| 4,027,970 | 6/1977 | Misek | 396/101 |
| 4,329,032 | 5/1982 | Aoki et al. | 354/25 |
| 4,775,892 | 10/1988 | Surdyke | 358/227 |
| 4,788,569 | 11/1988 | Yamada et al. | 354/409 |
| 4,794,459 | 12/1988 | Moberg et al. | 358/227 |
| 4,872,058 | 10/1989 | Baba et al. | 358/227 |
| 4,967,279 | 10/1990 | Murashima | 358/227 |
| 5,124,739 | 6/1992 | Kelleher | 354/413 |
| 5,187,516 | 2/1993 | Suzuki | 354/403 |
| 5,235,428 | 8/1993 | Hirota et al. | 358/227 |
| 5,289,220 | 2/1994 | Fidler et al. | 354/165 |
| 5,295,001 | 3/1994 | Takahashi | 358/482 |
| 5,322,998 | 6/1994 | Jackson | 250/216 |
| 5,369,436 | 11/1994 | Kawakami et al. | 348/355 |

FOREIGN PATENT DOCUMENTS

| | | | |
|---|---|---|---|
| 0318278 | 11/1988 | European Pat. Off. | H04N 5/232 |
| 0533590 | 9/1992 | European Pat. Off. | G01C 3/08 |
| 2226878 | 9/1990 | Japan | H04N 5/232 |
| 2129642A | 5/1984 | United Kingdom | 354/409 |

*Primary Examiner*—Russell E. Adams
*Attorney, Agent, or Firm*—Carr, DeFilippo & Ferrell

[57] ABSTRACT

A fixed lens camera comprises a fixed focus lens, an infrared filter, and an optical low pass filter, all disposed in succession within a housing, coaxial with an optical axis. Light from a target passes through an aperture in the housing, and then through the lenses and filters. An image sensor receives the filtered light, and outputs a two-dimensional array signal of corresponding voltages proportional to the incident light striking each sensing element. The voltage signal from the image sensor is filtered using a high pass filter, and the high frequency components of the signal are measured to determine the relative focus of the light from the target. The signal measurement is displayed on a bar LCD to enable focusing of the lens by moving the camera along the optical axis while observing the LCD output.

1 Claim, 5 Drawing Sheets

SYSTEM AND METHOD FOR DETECTING AND INDICATING PROPER FOCAL DISTANCE IN A FIXED LENS CAMERA

BACKGROUND OF THE INVENTION

1. Field of the Invention

This invention relates generally to fixed lens cameras, and more particularly to a fixed lens camera including a sensory indicator that signals changes in the relative focal distances between successive sample images taken by the camera.

2. Description of the Background Art

Taking a clear, sharp picture using a fixed lens camera with a close up lens attached requires knowing the exact distance between the camera's aperture and the target to be photographed. In other words, the depth of field does not provide for much tolerance in the focal length, and there is a very small distance before and after the focal plane, within which an image will still be clear. When attempting to take a close-up photograph of an object, the use of a close up lens is common. The use of a close up lens in a fixed lens camera decreases the tolerance in the focal length, making for a very shallow depth of field. Movement of the camera, even very small amounts from the optimal focal distance, will cause the image to fall out of focus.

Most people cannot estimate distances accurately enough to effectively use a fixed lens camera having a shallow depth of field to take clear close-up photographs every time. People can estimate larger distances within reasonable tolerances—such as a person's height being six feet, give or take a few inches. However, because the fixed lens camera including a close up lens requires an accurate measurement between the camera and the target, most people will not be able to take a focused, close-up photograph consistently, using this type of camera.

Previous attempts to overcome the shallow depth of field problem in fixed lens cameras include active range finding schemes via infrared light and sonar. Another active method is to provide the camera with a pair of focusing bar LED devices, each of which emit a light beam, where the light beams cross at the focal plane. The camera operator moves the camera toward or away from the object until he sees only one point of light on the object. Passive measurement schemes include providing a length of string or other measuring object whose length is the focal length, and directing the picture taker to use the string to determine the proper distance from the object at which to place the camera. These range finding schemes of the prior art add elaborate components to the camera and make the picture taking process more complex and difficult.

Auto focus cameras have an optimal focal distance measuring system that includes a lens adjusting mechanism, where the mechanism moves the lens in accordance with the measurement taken, in order to automatically focus the camera. Common auto focus systems are not applicable to fixed lens cameras, because the lens in a fixed lens camera is not movable or adjustable.

What is needed is a system in a fixed lens camera that assists the user in determining the proper focal distance of the camera, permitting the user to position the camera at that distance from the object.

SUMMARY OF THE INVENTION

In accordance with the present invention, a fixed focus lens, infrared filter, and optical low pass filter are disposed in succession within a housing, coaxial with an optical axis. Light from a target passes through an aperture, into the housing, and then through the lenses and filters. An image sensor, such as a CCD, periodically collects image data in a two-dimensional array. The image sensor outputs the two-dimensional array of corresponding analog voltages to an analog to digital (A/D) converter, which converts the analog voltages to digital sampled image data and outputs the digital array to a Central Processing Unit (CPU). The sampled image data is used to determine the relative focus of the light collected at the image sensor by calculating the high frequency energy components of the sampled image data.

In an alternative embodiment, an analog system rather than a digital CPU is used to process the image sensor data. The CCD image sensor outputs the two-dimensional array of corresponding analog voltages to an analog high pass filter which eliminates low frequency constituents of the sampled CCD image data. A peak detector is used to measure the peak magnitude of the filtered, high frequency image data.

A sensory indicator provides an indication, referred to as the Digital Focal Value, of the magnitude of high frequency energy measured in an image sample. Preferably, the sensory indicator is a bar LCD display comprising a series of optical indicators that turn on or off in succession relative to the magnitude of high frequency energy present in the image sample. As the camera is moved toward the focal point, the magnitude of high frequency energy contained in the image sample increases. This increase in high frequency energy is represented as an increasing magnitude on the bar LCD display. At the focal point, where the camera is placed at the optimal focal distance from the target, the peak amount of high frequency energy is displayed. As the camera is moved closer to the target, away from the focal point, the high frequency energy measured in subsequent sample images will be less than the amount of high frequency energy measured at the focal point, and the indicators of the bar LCD display will begin to turn off in reverse succession. From the bar LCD display's indication, the camera can be moved through a range of positions and back again until the optimal distance between the camera and the target is determined by the maximum number of bar LCD display indicators being turned on.

Alternatively, the sensory indicator may comprise an audio indicator that changes pitch or volume in proportion to the amount of high energy measured, a colored light that changes colors between the focal range and all points outside the focal range, or analog meters or levels that are placed within the visual range of the camera operator.

During camera use, the operator moves the camera to any position at which the target is visible through the view finder and notes the disposition of the sensory indicator. The operator then moves the camera preferably in a linear direction either toward the target or away from the target, and again notes the disposition of the sensory indicator at a second position. For each sample image the CPU determines the amount of high frequency energy in the sample.

DETAILED DESCRIPTION OF THE PREFERRED EMBODIMENT

Figure 1:
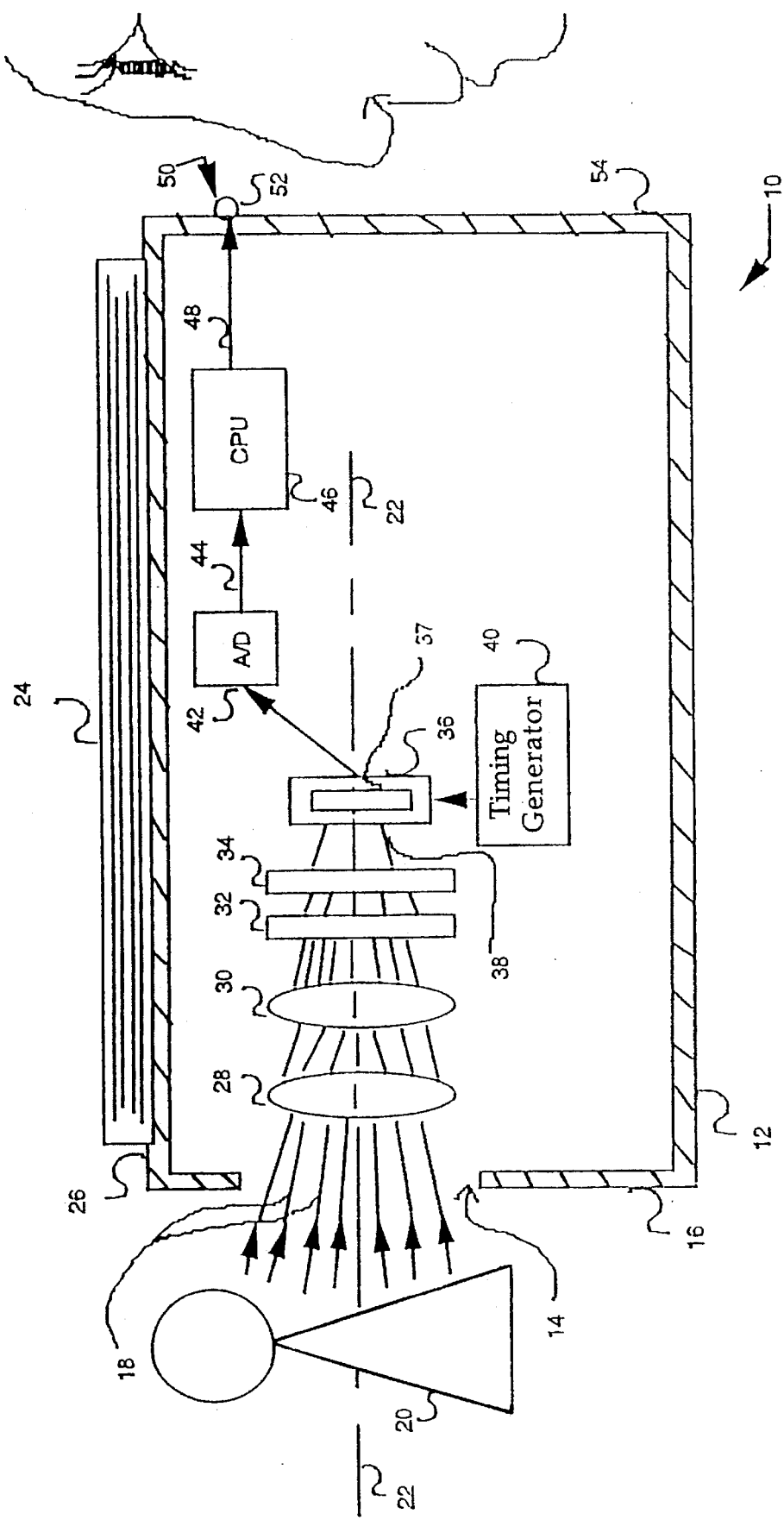
FIG. 1 is a cross-section of a fixed lens camera in accordance with the present invention, schematically illustrating the camera's components.

Referring now to FIG. 1, a cross-section of a fixed lens camera 10 in accordance with the present invention is shown. A generally rectangular housing 12 includes an aperture 14 formed in the housing's front side 16 for allowing light 18 from a target 20 to pass into the housing 12 along an optical axis 22. A view finder 24, disposed upon the housing's top side 26, is used for optically viewing the target 20 in order to align the aperture 14 with the target 20.

A close-up lens 28, fixed focus lens 30, infrared filter 32 and optical low pass filter 34 are disposed in succession within the housing 12, coaxial with the optical axis 22. The close-up lens 28 receives the light 18 from the target 20 through the aperture 14 and directs the light 18 to the fixed focus lens 30. The light 18 is refracted through the fixed focus lens 30, filtered through the infrared filter 32 and passed onto the optical low pass filter 34. The infrared filter 32 allows selected wavelengths of visible light to pass while absorbing infrared light. The optical low pass filter 34 passes light patterns below a selected frequency and attenuates all others in order to prevent aliasing that occurs with high frequency light patterns. An image sensor timing generator 40 including an internal clock, periodically directs an image sensor 36 to receive image data 37 corresponding to the target 20. The two-dimensional image sensor 36 is preferably a charge coupled device that records the image data 37 as an array of analog voltages. The image sensor 36 is disposed in coaxial alignment with the optical axis 22, and is positioned to receive filtered light 38 containing the image data from the optical low pass filter 34. The image sensor 36 measures the illumination of the filtered light 38 on a pixel by pixel basis, outputs a two-dimensional array of corresponding analog voltages to an analog to digital (A/D) converter 42. The A/D converter 42 converts the analog voltages to corresponding digital values, on a pixel by pixel basis, and outputs the digital array 44 to a Central Processing Unit (CPU) 46. Using a conventional high pass filter, a filtering operation is performed on the digital array 44 to attenuate the low frequency components of the image data 37. The high frequency components are combined using a conventional center weighting function to produce a digital focal value. The filtering process is discussed in more detail with respect to FIG. 2 below. The digital focal value is displayed by a sensory indicator 50, preferably mounted on the housing's rear side 54. In the preferred embodiment, the sensory indicator 50 is a bar LCD display 52 comprising a sequence of lights which indicate the relative magnitude of high frequency energy image data.

Figure 2:
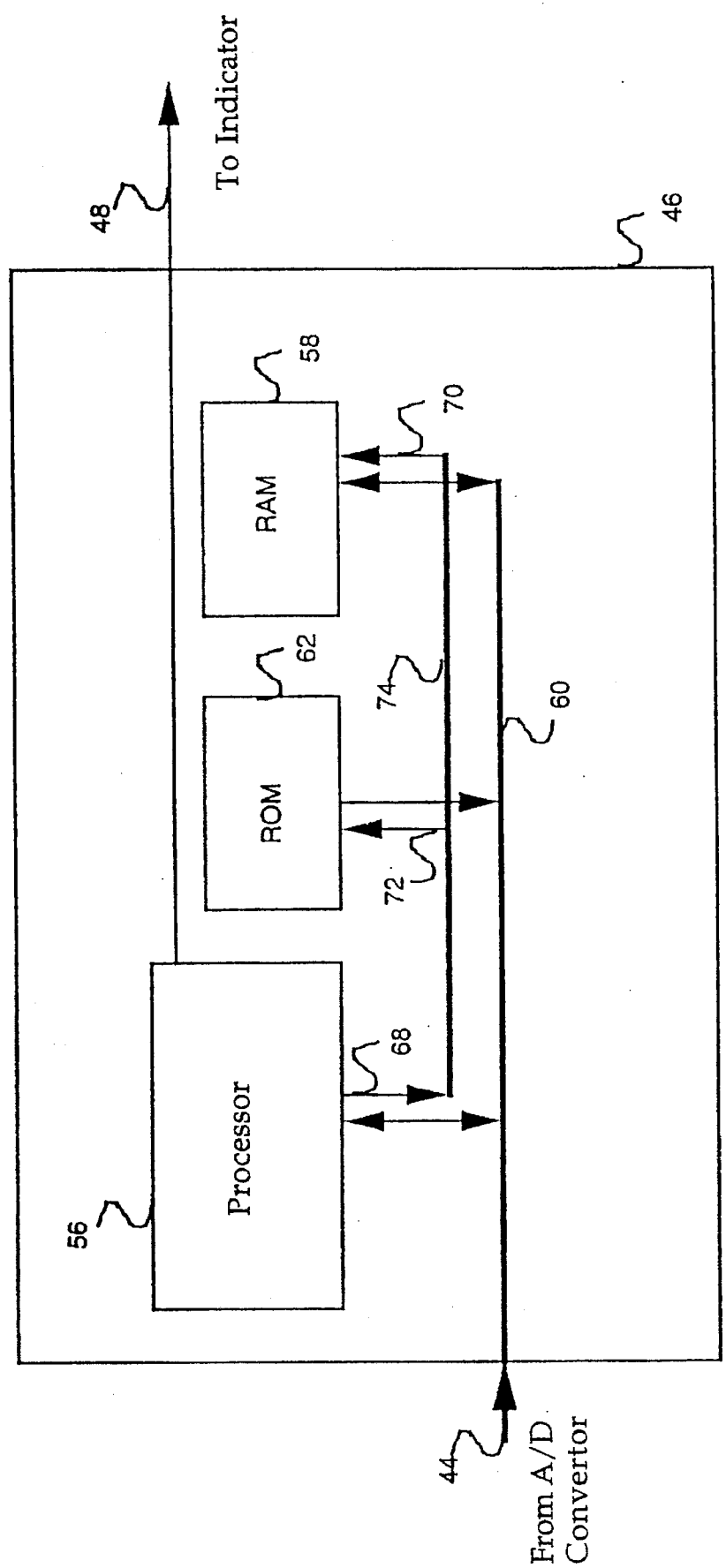
FIG. 2 is a block diagram further illustrating the elements comprising the central processing unit (CPU) of the preferred embodiment.

Referring now to FIG. 2, a block diagram is shown further illustrating the elements of the CPU 46. The CPU 46 is comprised of a conventional microprocessor 56 connected to memory components such as ROM 62 and RAM 58 by a data bus 60, using a Von Neuman architecture. Although a microprocessor 56 is shown, a finite state machine or other digital system coupled between the A/D converter 42 and sensory indicator 50 could equivalently be used. It should also be noted that although digital processing is used in filtering the image sensor 36 data, processing of the image sensor 36 data can alternatively be performed using analog circuitry as discussed with reference to FIG. 3. The Read Only Memory (ROM) 62 stores a sequence of programmed steps for execution of the high pass filtering operation on the digital array 44 by the microprocessor 56. A Random Access Memory (RAM) 58 temporarily stores the digital array 44 imported from the A/D converter 42 and makes the digital array 44 available to the microprocessor 56.

In operation, the digital array 44 from the A/D converter 42 is carried across data bus 60 to the RAM 58, where it is stored. When a subsequent sample image is taken and transmitted to the RAM 58, the subsequent image will replace the previous image stored. The microprocessor 56 communicates with the ROM 62 across an address bus 74 to access instructions according to the stored digital focal value determination system, for operation on the digital array 44.

The digital focal value determination is a high pass filtering operation that detects voltage magnitude transitions between adjacent cells of the digital array 44. Low frequency energy values are filtered out and the high frequency energy is totaled or summed by a weighting function to provide the digital focal value. Since optimum focus is characterized by sharp contrasts within the image, by measuring the high frequency components of adjacent sample points within the image, a measure of relative focus is achieved. This digital focal value is a magnitude which represents the relative sharpness or focus of the image data 37 received by the image sensor 36.

Figure 3:
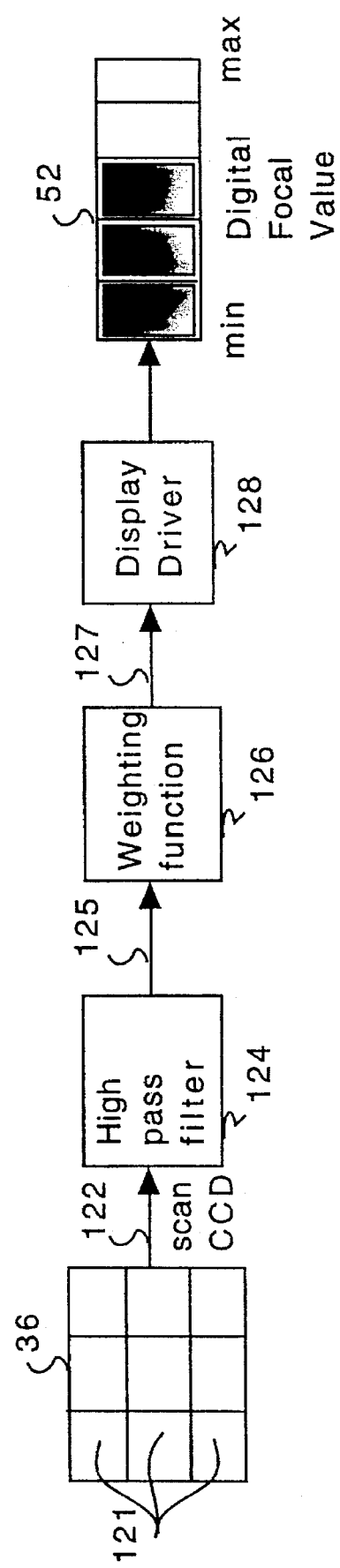
FIG. 3 is a block diagram illustrating the functional steps used in converting scanned CCD data collected from an image sensor to a digital focal value displayed on a bar LCD sensory indicator.

Referring now to FIG. 3, a block diagram is shown for converting data from image sensor 36 into a digital focal value which is displayed on bar LCD display 52. Image data collected by image sensor 36 is stored as an array of voltages within the cells 121 of the image sensor. Each cell 121 of the image sensor 36 contains an analog voltage corresponding to the intensity or magnitude of light which impacts the individual cell 121. The voltages stored within the cells 121 are individually scanned and transmitted to high pass filter 124 as a sequential stream of scanned CCD data 122. In the preferred embodiment, this scanned CCD data 122 is converted to digital signals using an A to D converter 42 (FIG. 2). In this preferred embodiment processing is performed digitally by CPU 46. Alternatively, processing of the image data 37 is performed using analog components. The scanned CCD data 122 in the alternative analog embodiment is transmitted to the high pass filter 124 as a series of analog voltages.

The scanned CCD data 122 is filtered in high pass filter 124 to remove low frequency signal constituents. The purpose of removing the low frequency constituents is to accentuate sharp transition regions between adjacent cells 121 in the image sensor 36. One characteristic of unfocused image data is that adjacent cells 121 will tend to have voltage magnitudes which change very slowly from cell to cell. Images which are characterized by a sharp focus will tend to have distinct voltage differences between adjacent cells 121. The high pass filter 124 serves to remove those adjacent data samples which show little voltage distinction.

Following the filter process of high pass filter 124, the filtered CCD data 125 is processed by weighing function 126. Weighing function 126 is, in its simplest form, a peak detector which identifies the magnitude of the largest high frequency component. Alternatively, the weighing function 126 forms a summing function which sums the peaks of all high frequency constituents of the filtered CCD data 125. A second alternative is to apply a conventional weighing function to the filtered CCD data in order to compensate for specific image characteristics, for instance, which might be caused by optical coatings applied to the camera lens 30. Following the application of the weighing function 126, the weighted data 127 is transferred to a display driver 128 which converts the data 127 into a digital focal value suitable for driving bar LCD display 52. The display driver 128 normalizes the data between appropriate voltage boundaries in order to enable the weighted data 127 to appropriately interface with the bar LCD display 52. Voltage boundaries for the digital focal value are defined such that a small amounts of high frequency in the filtered CCD data 125 will produce a minimum reading on the bar LCD display 52. By contrast, a filtered CCD data which contains a maximum amount of high frequency will produce the highest value on the bar LCD display 52. It should also be noted that various other alternative and equivalently useful display drivers can be used in replacement of the bar LCD display 52. The exact functionality of display driver 128 will in a large part be driven by the signal requirements of the sensory indicator 50. It should also be noted that whether an analog signal or a digital signal is used in producing the digital focal value is largely a choice of design, and that producing the value could be implemented in a variety of equivalent ways.

Figure 4A:
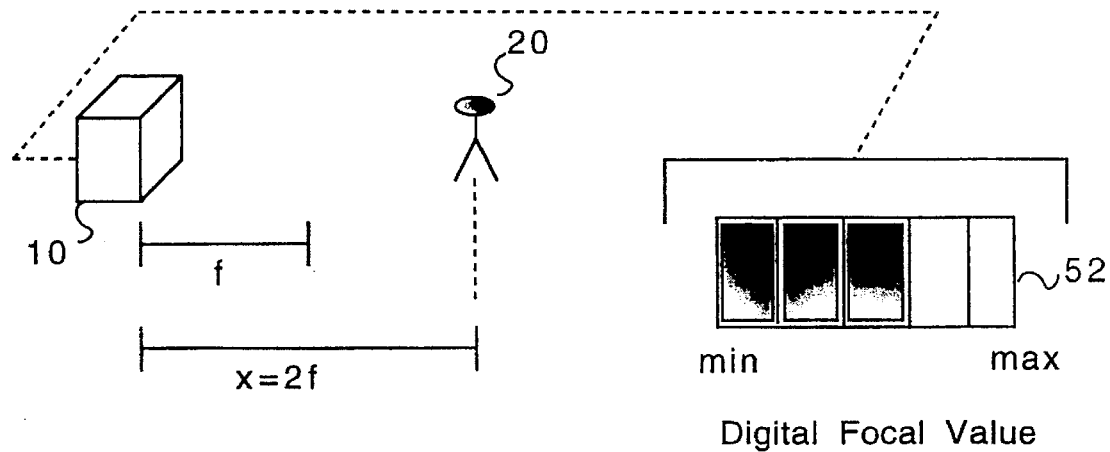
FIG. 4(a) illustrates the digital focal value reading of a target distance, x, which is twice the optimal focal distance, f, of the camera.

Referring now to FIG. 4(a), a diagram is shown illustrating the digital focal value reading on bar LCD display 52, when the target distance, x, exceeds the optimal focal distance, f, of the camera 10. In the example of FIG. 4(a), the target distance x is shown as twice the distance of the optimal focal distance, f. The bar LCD display 52 located on the rear of camera 10 shows a magnitude approximately half way between the MINI and MAX indicators.

Figure 4B:
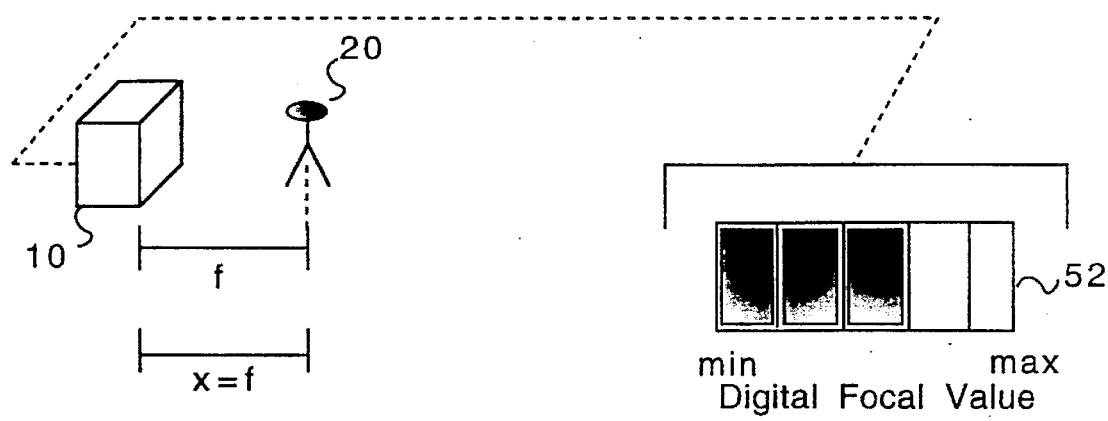
FIG. 4(b) illustrates the digital focal value reading of a target distance equal to the optimal focal distance of the camera.
Figure 4C:
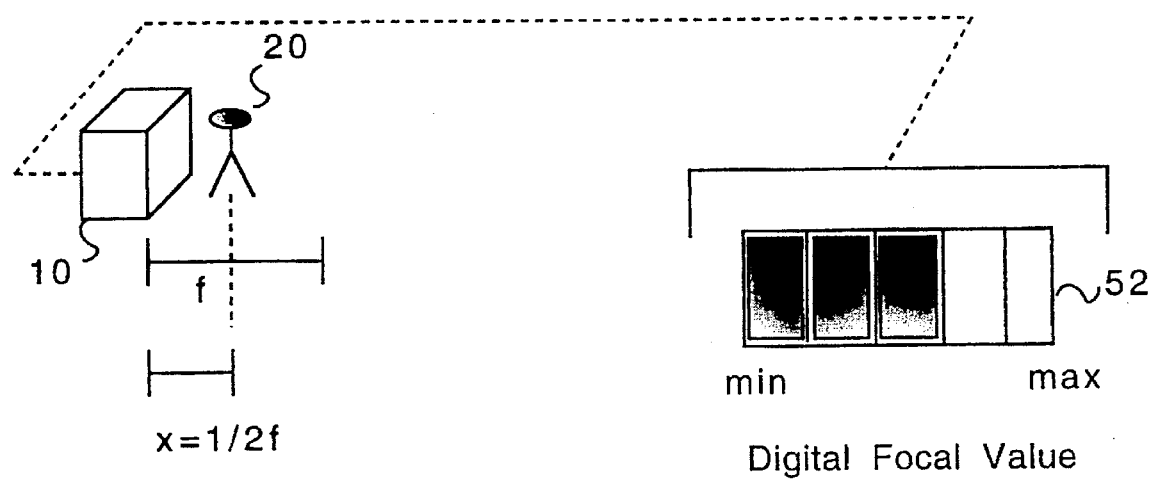
FIG. 4(c) illustrates the digital focal value reading of a target distance equal to one-half the focal distance of the camera.

FIG. 4(b) illustrates the digital focal value reading on bar LCD 52, when the target distance, x, equals the optimal focal distance, f, of camera 10. The bar LCD display 52 shows a magnitude reading near the maximum indication. FIG. 4(c) illustrates the digital focal value reading on bar LCD 52, when the target distance, x, is one-half the optimal focal distance, f. As in the example of FIG. 4(a) the bar LCD display 52 shows a magnitude approximately half way between the MIN and MAX indications. The correspondence between target distance, x, and the digital focal value is preferably non-linear so that even through the target distance, x, is very large (or very small) relative to the optimal focal distance, f, a digital focal value will still register on the bar LCD display 52 until a maximum reading is indicated on bar LCD display 52. To determine when the camera 10 is placed at the optimal focal distance, f, from the target 20, the camera 10 is moved along the optical axis 22 (FIG. 1).

The invention has now been explained with reference to specific embodiments. Other embodiments will be apparent to those of ordinary skill in the art in light of this disclosure. For instance, the implementation of the processing circuitry of FIG. 3 could alternatively be equivalently implemented using either analog or digital components. Therefore, it is not intended that this invention be limited, except as indicated by the appended claims.

What is claimed is:

1. A camera comprising:

a fixed focus lens disposed along an optical axis;

an image sensor optically coupled to the lens for receiving image data;

a processor coupled to the image sensor for analyzing the received image data to determine a relative focus of the received image data based on frequency components of the image data;

an infrared filter disposed between the lens and the image sensor, coaxial with the optical axis, for blocking infrared light from passing from the lens to the image sensor; and a low pass filter disposed between the infrared filter and the image sensor, coaxial with the optical axis.

* * * * *